United States Patent Office 3,312,195
Patented Apr. 4, 1967

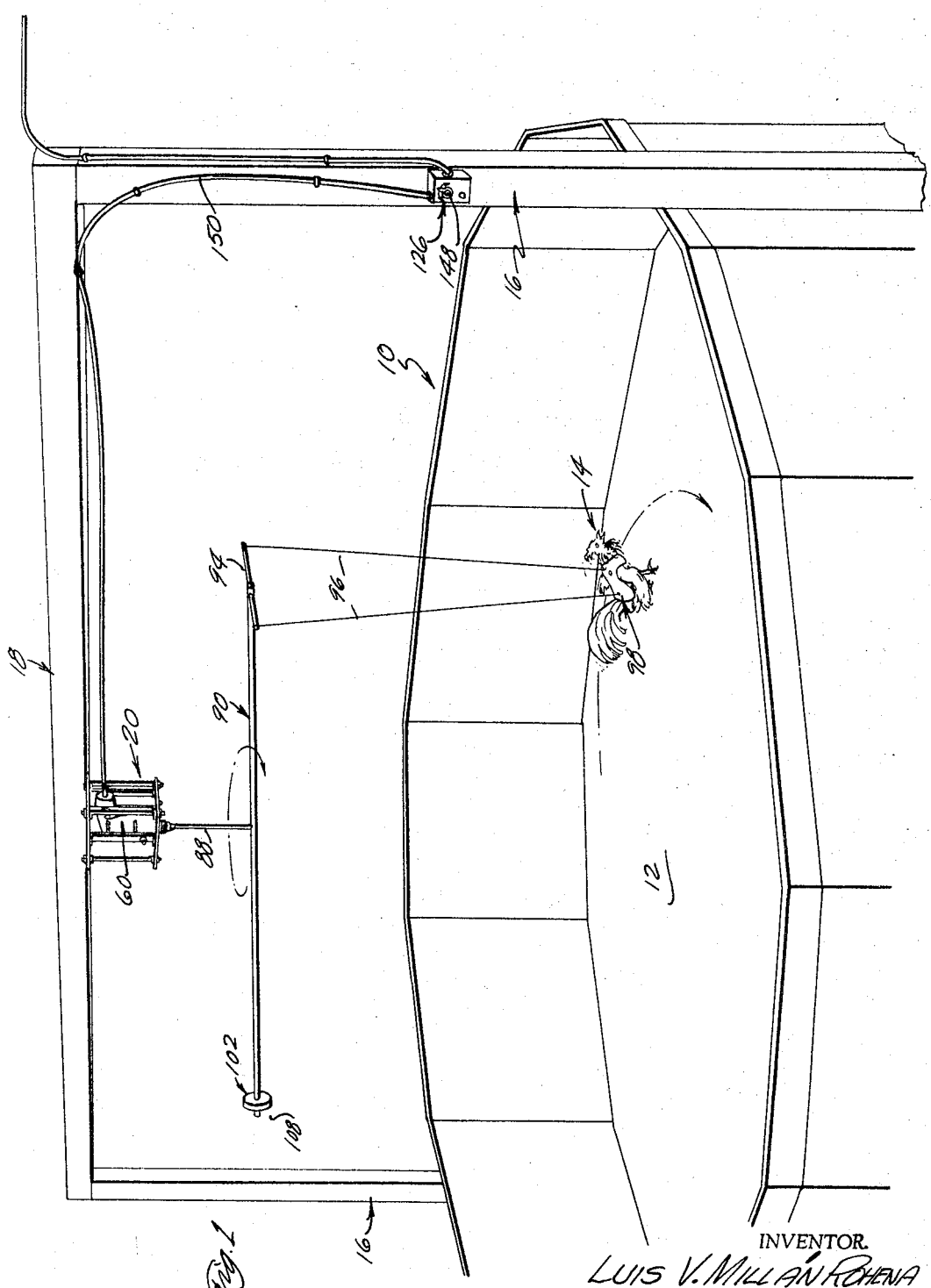

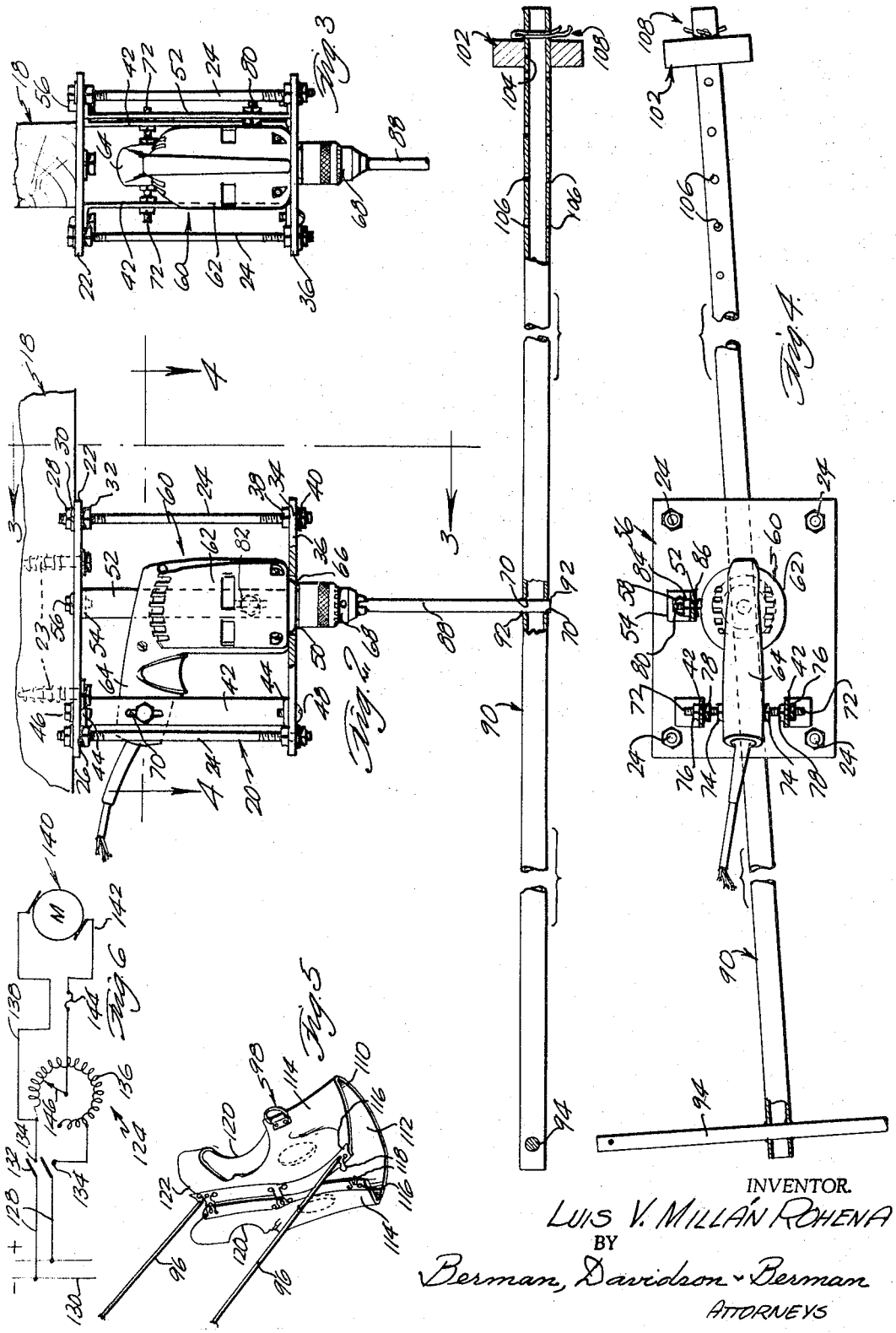

3,312,195
MECHANICAL ANIMAL TRAINER
Luis V. Millán Rohena, c/o Puerto Rico Water Resources Authority, Engr. & Constr. Division, Stop 16½, Santurce, Puerto Rico
Filed Oct. 22, 1965, Ser. No. 502,198
11 Claims. (Cl. 119—29)

This invention relates to a mechanical trainer for animals, especially but not exclusively, fighting cocks, wherein the animal to be trained is adapted to be caused to run around a circuit.

The primary object of the invention is the provision of an economical, practical, and more efficient device of the kind indicated, which is adapted to utilize a live animal, such as a fighting cock, as the attraction for the animal being trained, the live quarry normally pursued by the animal.

Another object of the invention is the provision of a mechanically and structurally superior device of the kind indicated above, which is characterized by simplicity and a small number of parts, and which is electrically operated, and is adapted to be driven by an ordinary portable electric drill, whereby a person in possession of such a drill is enabled to have, at little cost, an easily set up and easily used means of training and exercising an animal, in the manner indicated above.

A further object of the invention is the provision of a device of the character indicated above, which embodies simple and effective electrical control means, whereby the speed of rotation of the quarry animal is adapted to be speeded up or slowed down, or maintained constant at different speeds.

In the drawings:

FIGURE 1 is a schematic perspective view of a device of the invention;

FIGURE 2 is an enlarged and contracted side elevation, partly broken away and in section, showing the active components of the device;

FIGURE 3 is a fragmentary vertical transverse section, taken on the line 3—3 of FIGURE 2;

FIGURE 4 is a horizontal section taken on the line 4—4 of FIGURE 2;

FIGURE 5 is an enlarged perspective view of the animal sling; and,

FIGURE 6 is a schematic wiring diagram for the drive motor and its control.

Referring in detail to the drawings, a ground-supported circular fence 10 is shown, which encloses a track 12 around which an animal to be trained and exercised, such as a fighting cock, is adapted to be caused to run in pursuit of a live animal quarry, such as another fighting cock 14.

At diametrically opposed locations of the fence 10, perpendicular posts 16 are erected, outside of and extending above the fence, the posts being spanned, at their upper ends, by a fixed horizontal cross member 18. To the undersurface of the cross member 18, at the center thereof, is fixed a motor cage 20.

The motor cage 20 is adapted to be composed of an upper horizontal rectangular plate 22, fixed in place, as by means of screws 23 extending therethrough and threaded into the cross member 18. Perpendicular corner rods 24 have upper end portions extended through openings 26, in the upper plate 22, and secured adjustably in place, by means of upper nuts 28 and washers 30, and lower lock nuts 32. The rods 24 have lower end portions, which extend through corner openings 34 of a lower plate 36, spaced at a substantial distance below and parallel to the upper plate 22, and which are secured adjustably in place, as by means of upper nuts 38 and lower lock nuts 40.

A pair of parallel spaced vertical struts 42, located near one end of the motor cage 20, inwardly of the adjacent rods 24, have lateral flanges 44, on their ends, which bear against the facing sides of the upper and lower plates 22 and 36, respectively, and are secured thereto, as by means of upper and lower screws 46 and 48, respectively. At the location longitudinally offset from the center of the lower plate 36, the lower plate is formed with a circular opening 50. Located at one side of and in line with a diameter of the opening 50 is a single vertical strut 52, having lateral flanges 54, on its ends, which are secured to the upper and lower plates 22 and 36, as by means of upper and lower screws 56 and 58, respectively.

A portable electric drill 60, having a perpendicularly disposed housing 62 equipped with a lateral handle 64, is fixedly but adjustably supported on and within the cage 20. An existent circular boss 66, on the lower end of the drill housing 62 is disposed in the lower plate opening 50, with the lower end of the housing resting upon the lower plate; and with the drill handle 64 extending outwardly between the pair of struts 42, the drill being positioned so that its downwardly extending chuck 68 is disposed in the vertical center of the training track 12.

The drill 60 is secured adjustably in place, by means whose adjustability admits of the use of portable electric drills of varying construction. The struts 42 are formed, in the upper parts thereof, with aligned vertical slots 70 through which extend set screws 72, having heads 74, on their inner ends, which bear clampingly against opposite sides of the drill handle 64, outer and inner nut assemblies 76 and 78, being threaded on the set screws and engaged with opposite sides of the struts 42. A lateral stud 80, already present on the drill housing 62, or applied thereto, extends through a vertical slot 82, formed in a lower part of the single strut 52, and outer and inner nut assemblies 84 and 86, respectively, are threaded on the stud 80 and bear against related sides of the single strut 52. The nut assemblies employed as indicated above, relative to the struts 42 and the single strut 52, can be of any desired construction, and can include spring or other types of washers.

A perpendicular shaft 88 is chucked, at its upper end, in the drill chuck 68, and, at its lower end, extends through openings 70, in the opposed walls of a tubular horizontal beam 90, substantially at the center thereof, and is fixed to the beam, as by means of weldings 92. At one end thereof, the beam 90 has fixedly extended therethrough a horizontal cross bar 94, which extends equally from the opposite sides of the beam. Cables or cords 96 are suitably fixed, at their upper ends, to the cross bar 94, at the ends thereof, and, at their lower ends, are secured to a live animal sling 98.

For counterbalancing the weight of the cross bar 94, the cords 96, the sling 98, and the weight of a live quarry 14, such as a fighting cock, an adjustable counterweight 102 is provided for selective positioning along the end of the beam 90, opposite to the cross bar 94. The counterweight 102 can be a solid disc of lead or the like, formed with an axial bore 104, slidably receiving the beam 90, the related part of the beam 90 being formed with longitudinally spaced pairs of vertical bars 106, through which a stop, such as a cotter pin 108, is adapted to be removably and selectively engaged, and with which the outer side of the counterweight is adapted to be engaged by centrifugal force, as the beam 90 is rotated.

The animal body sling 98, designed to give maximum freedom of normal action by the live quarry animal carried, is formed of a flexible sheet 110, of transparent plastic material, so as to show therethrough the natural colors of the animal. The sheet 110 comprises a main portion 112, to supportably engage the underpart of the animal, and sides 114 adapted to engage around the sides of the animal, the sides 114 having reinforced free edge portions 116 adapted to be secured together, over the body of the animal, as by means of interengageable fastener members 118. Openings 120 are provided, in the sides 114, of a shape and size to afford freedom of action of the legs of the animal, and notches 122, in the front ends of the sides, are provided to provide clearance with the neck of the animal. The cords 96 depending from the cross bar 94, on the beam 90, are severally secured, at their lower ends, to the front and rear ends of one of the reinforced edge portions 116 of the sling 98.

An electrical on-and-off and speed control 124, for the operation of the drill 60, is preferably conveniently mounted on one of the posts 16, and comprises a box 126, enclosing, as indicated in FIGURE 6, lines 128 connected to related sides of an electric current source 130, the lines 128 being connected to switch arms 132, related to switch contacts 134. Related ones of the contacts 134 are severally connected to opposite ends of a rheostat element 136. A line 138 leads from one of the contacts 134 to one side of the electric motor 140 of the drill 60, while the other side of the motor is connected by the line 142, containing a fuse 144, to a slider 146 which is movably engaged with the rheostat element 136. A knob 148 is provided on the control box 126, which serves both to operate the switch arms 132, relative to the contacts 134, and to move the slider 146 along the rheostat element. The lines 138 and 142 are contained in the usual duplex electric cord 150 which leads from the control box 126 and along a post 16 and the cross member 18, to the electric drill 60.

What is claimed is:

1. An animal training device of the character described, comprising an overhead support, motor means carried by the support, a pendant shaft operatively connected to the motor means, a horizontal beam centrally fixed on the lower end of said shaft, a live animal body sling suspended from one end of the beam, and means connected to the motor means for controlling the operation thereof.

2. A device according to claim 1, wherein the other end of the beam is equipped with counterbalance means for counterbalancing the weight of the sling and a live animal carried thereby.

3. A device according to claim 1, wherein said support comprises a ground supported post and a horizontal cross member fixed to the post and extending laterally from the post, said motor means being mounted on the cross member.

4. A device according to claim 1, wherein said support comprises a horizontal cross member positioned above the ground, said motor means comprising a motor cage fixed to the cross member, an electric motor fixed within the cage and having a vertical rotary shaft, said pendant shaft fixed at its upper end to the lower end of the motor shaft.

5. A device according to claim 1, wherein said support comprises a horizontal cross member positioned above the ground, said motor means comprising a motor cage fixed to the cross member, an electric motor fixed within the cage and having a vertical rotary shaft, said pendant shaft fixed at its upper end to the lower end of the motor shaft, a cross bar fixed on said horizontal beam at said one end, cords secured at their upper ends to the cross bar at the ends thereof, the animal sling being secured to the lower ends of the cords.

6. A device according to claim 1, wherein the other end of the beam is equipped with counterbalance means for counterbalancing the weight of the sling and a live animal carried thereby, said counterbalance means comprising a weighty body forward with a bore slidably receiving the beam, the said other end of the beam being formed with longitudinally spaced transverse bores, and a removable and replaceable stop selectively engaged through transverse bores for holding the weighty body in selected positions along the beam.

7. A device according to claim 1, wherein said motor means comprises a motor cage fixed to the support, said cage comprising an upper plate fixed to the support, vertical rod means secured to and extending downwardly from the upper plate, a lower plate spaced downwardly from the upper plate and fixed to the rod means, said lower plate being formed with an opening, an electric motor supported on the lower plate and having a vertical drive shaft to which said pendant shaft is fixed, the drive shaft extending downwardly through the opening of the lower plate.

8. A device according to claim 1, wherein said motor means comprises a motor cage fixed to the support, said cage comprising an upper plate fixed to the support, vertical rod means secured to and extending downwardly from the upper plate, a lower plate spaced downwardly from the upper plate and fixed to the rod means, said lower plate being formed with an opening, an electric motor supported on the lower plate and having a vertical drive shaft to which said pendant shaft is fixed, the drive shaft extending downwardly through the opening of the lower plate, said motor comprising a portable electric drill having a vertical housing resting at its lower end on the lower plate, and containing said drive shaft, said drive shaft having a chuck extending below the lower plate in which the upper end of the pendant shaft is chucked.

9. A device according to claim 1, wherein said motor means comprises a motor cage fixed to the support, said cage comprising an upper plate fixed to the support, vertical rod means secured to and extending downwardly from the upper plate, a lower plate spaced downwardly from the upper plate and fixed to the rod means, said lower plate being formed with an opening, an electric motor supported on the lower plate and having a vertical drive shaft to which said pendant shaft is fixed, the drive shaft extending downwardly through the opening of the lower plate, said motor comprising a portable electric drill having a vertical housing resting at its lower end on the lower plate, and containing said drive shaft, said drive shaft having a chuck extending below the lower plate in which the upper end of the pendant shaft is chucked, said drill having a lateral horizontal handle on its housing, a pair of laterally spaced struts extending between and secured to the upper and lower plates, said handle being securably engaged between the pair of struts.

10. A device according to claim 1, wherein said motor means comprises a motor cage fixed to the support, said cage comprising an upper plate fixed to the support, vertical rod means secured to and extending downwardly from the upper plate, a lower plate spaced downwardly from the upper plate and fixed to the rod means, said lower plate being formed with an opening, an electric motor supported on the lower plate and having a vertical drive shaft to which said pendant shaft is fixed, the drive shaft extending downwardly through the opening of the lower plate, said motor comprising a portable electric drill having a vertical housing resting at its lower end on the lower plate, and containing said drive shaft, said drive shaft having a chuck extending below the lower plate in which the upper end of the pendant shaft is chucked, said drill having a lateral horizontal handle on its housing, a pair of laterally spaced struts extending between and secured to the upper and lower plates, said handle being securably engaged between the pair of struts, and a single strut extending between and secured to said upper and lower plates adjacent to the lower plate opening, said drill housing being securably engaged with the single strut.

11. A device according to claim 1, wherein said sling comprises flexible cord means secured at one end to the beam, a flexible sheet having a main portion adapted to engage the underpart of an animal and sides adapted to embrace the sides of the animal, said sides having free edge portions, means for separably securing said free edge portions together over the animal, said cord means being secured at the lower end thereof to spaced points of a free edge portion.

References Cited by the Examiner

UNITED STATES PATENTS

| | | | |
|---|---|---|---|
| 164,296 | 6/1875 | Harris | 119—101 |
| 478,513 | 7/1892 | Kelly | 119—29 |
| 825,970 | 7/1906 | Hoover | 119—29 |
| 1,062,495 | 5/1913 | Olin | 119—29 |
| 1,956,937 | 5/1934 | Van Kleek | 119—29 |
| 2,871,915 | 2/1959 | Hogan | 272—70 |
| 3,113,340 | 12/1963 | Bush et al. | 17—1 |

SAMUEL KOREN, *Primary Examiner.*

ALDRICH F. MEDBERY, *Examiner.*